US007626812B2

(12) United States Patent
Chang et al.

(10) Patent No.: US 7,626,812 B2
(45) Date of Patent: Dec. 1, 2009

(54) REMOVABLE HARD-DISK STRUCTURE WITHOUT SCREWS

(75) Inventors: Cheng-Chung Chang, Taipei County (TW); Shi-Jun Weng, Taipei (TW)

(73) Assignee: Sercomm Corporation, Taipei (TW)

( * ) Notice: Subject to any disclaimer, the term of this patent is extended or adjusted under 35 U.S.C. 154(b) by 154 days.

(21) Appl. No.: 12/010,914

(22) Filed: Jan. 31, 2008

(65) Prior Publication Data

US 2009/0195926 A1 Aug. 6, 2009

(51) Int. Cl.
*G06F 1/16* (2006.01)

(52) U.S. Cl. ............................ 361/679.33; 361/679.37; 361/679.39; 312/223.1; 312/223.2

(58) Field of Classification Search ............. 361/679.33
See application file for complete search history.

(56) References Cited

U.S. PATENT DOCUMENTS 3,700,301 A * 10/1972 Boeck ........................ 312/333
5,454,080 A * 9/1995 Fasig et al. ................. 710/302
6,166,900 A * 12/2000 Flynn et al. ............ 361/679.35
6,370,608 B2 * 4/2002 Yamada et al. .............. 710/301
6,392,879 B1 * 5/2002 Chien .................... 361/679.33
6,618,259 B1 * 9/2003 Hood et al. ................. 361/740
6,714,409 B2 * 3/2004 Chen ..................... 361/679.33
6,751,092 B1 * 6/2004 Ohnishi et al. ......... 361/679.34
6,791,828 B2 * 9/2004 Gough et al. .......... 361/679.33
6,952,341 B2 * 10/2005 Hidaka et al. .......... 361/679.32
7,481,505 B2 * 1/2009 Orita .......................... 312/333
2003/0193781 A1 * 10/2003 Mori .......................... 361/725
2008/0080130 A1 * 4/2008 Chen .......................... 361/685
2008/0297996 A1 * 12/2008 Fierro ........................ 361/681

* cited by examiner

*Primary Examiner*—Jayprakash N Gandhi
*Assistant Examiner*—Anthony Q Edwards
(74) *Attorney, Agent, or Firm*—Bacon & Thomas, PLLC

(57) ABSTRACT

The present invention relates to a removable hard-disk structure without screws at least comprising a housing, a first elastic arm, a second elastic arm and a removable component. The housing having a placing space is connected to an opening end to enable the hard disk be placed into the placing space, and a door plate is further installed at the opening end to avoid the hard disk departing from the housing. The first and the second elastic arms are installed at the top surface and two side surfaces respectively, and these elastic arms are cantilever type and extend a pressing end into the placing space, which holds and presses the hard disk, and the hard disk is correctly being placed into the placing space. The removable component has a connecting end which is connected into the placing space, as the hard disk is placed in the placing space, the removable component fits the hard disk, and thus the hard disk can be easily removed by applying force on the removable end of the removable component.

14 Claims, 6 Drawing Sheets

313
3131
A'
312
31
3121
321
32
3111
311
A
331
33
3122
341
35
314
3141
34
342

REMOVABLE HARD-DISK STRUCTURE WITHOUT SCREWS

FIELD OF THE INVENTION

The present invention relates to a hard-disk structure, especially relates to a technique for replacing a hard disk without screws.

DESCRIPTION OF PRIOR ART

Refer to FIG. 1, is a conventional removable hard disk structure. According to the figure, the removable hard disk structure at least comprising an outer frame 11, a hard disk housing 12 and a removable pull rod 13. The outer frame has two side plates 111, a rear plate 112 and a front plate 113, wherein the front plate 113 having a through hole 114 is installed at one end of the two side plates 111; the rear plate 112 is installed at the other end of the two side plates 111. A placing space 115 is then formed with the front plate 113, the rear plate 112 and the two side plates 111, thereby connecting the through hole 114 of the front plate 113. The hard disk housing 12 comprises a slot body 121, a rear connecting plate (not shown in the figure), a front door plate 122 and a lid plate 123, wherein the slot body 121 is used for placing a hard disk (not shown in the figure), and a rear connecting plate is placed at the rear side of the slot body, and a front door plate 122 is installed at the front side of the slot body and the lid plate 123 is then installed on the slot body 121, so that a sealed space in the slot body 121 is then formed by the front door plate 122, the rear connecting plate and the lid plate 123. The removable pull rod 13 with a "U" shape is pivotally connected to the hard disk housing 12 and comprises a pressing portion 131 installed on the two sides of the "U" shape. The lid plate 123 is covered to prevent the hard disk from coming off the hard disk housing 12 after the hard disk is placed into the slot body 121 of the hard disk housing 12, and the hard disk housing 12 can be placed in the placing space 115 by the through hole 114 connected with the placing space 115. As the hard disk housing 12 has to be removed, the removable pull rod 13 must be released in advance and the front plate 113 is then pressed by the pressing portion 131 of the removable pull rod 13 to easily remove the hard disk housing 12 away from the outer frame 11 by applying force on the removable pull rod 13.

Refer to FIG. 2, is a conventional quick pluggable hard disk structure. According to the figure, the quick pluggable hard disk structure comprises a hard disk frame body 21, a linkage mechanism 22 and a draw door mechanism 23. The hard disk frame body 21 comprises a door plate 211, a rear plate 212 and two side plates 213; and the linkage mechanism 22 comprises a push rod 221, a connecting rod 222 and a linkage rod 223; and the draw door mechanism 23 comprises a draw door 231 and a releasing body 232. Since the two ends of the side plates 213 are respectively connected to the door plate 211 and the rear plate 212, a placing space 214 is then formed with the door plate 211, the rear plate 212 and the two side plates 213 and is connected to a through hole 215 of the door plate 211, and the hard disk can be placed into the placing space 214 through the through hole 215. One of the two side plates 213 comprises a placing body 216, which exceeds the side plates with a distance 217 to enable the linkage rod 223 of the linkage mechanism 22 to be placed therein. The rear plate 212 comprises a notch 219 for placing the push rod 221 and pivotally connecting the pivot portion of the push rod 221 on a side of the rear plate 212. While the push rod 221 and the linkage rod 223 is connected by the connecting rod 222. The draw door mechanism 23 is installed to the through hole 215 of the door plate 211, and the draw door 231 of the draw door mechanism 23 is pivotally connected to the through hole 215 when the linkage mechanism 22 is also connected to the draw door 231. While releasing the releasing body 232 of the draw door mechanism 23, the draw door 231 of the draw door mechanism 23 is pulled out and the linkage rod 223 is then driven to generate the displacement along the side plate extending direction 218. The push rod 221 is further pushed through the linkage rod 223 and the push rod 221 connected to the connecting rod 222 to allow the push rod 221 to perform a lever action, thereby pushing the hard disk out of the placing space 214.

However, according to the conventional removable hard disk structure and the conventional quick pluggable hard disk structure, the structure of the hard disk removable structure is too complicated by further including an outer frame besides a hard disk housing; and in the linkage rod of the hard disk quick pluggable structure, the rigidity of the linkage mechanism has to be considered. Both structures are not good designs. When the hard disk made of different brands are used, the placing space of the middle portion of placing the hard disk is fixed design. Consequently, the hard disk may be vibrated due to the vibrations generated by the motor inside the hard disk while using the hard disk, resulting in damaging the connection head connected to the hard disk.

For satisfying the above mentioned purposes, which hope for achieving the convenience of the removable hard disk with a simple method, locking without screws and placing the elastic arms to accept the tolerance of the size of the hard disk with different brands in the housing to meet the needs for reducing the damage of the connecting head resulted from the vibration of the hard disk. The inventor proposes a removable hard-disk structure without screws to be the method for carrying out the hope in this invention according to various researches, designs and monographic studies, based on many years' research and experiences.

SUMMARY OF THE INVENTION

On account of the subject above mentioned, an object of the present invention is to provide a removable hard-disk structure without screws, which holds hard disks with a pressing end of elastic arms, this replaces the screws for locking the hard disk, and the hard disk can be easily removed by applying force on the removing end of the removable component to reach the object of quick replacement.

Thus, for this purpose, a removable hard-disk structure without screws according to the present invention comprises a housing, at least one first elastic arm, at least one second elastic arm and a removable component. The housing comprises an opening end and a placing space, wherein the placing space has a top surface and two side surfaces corresponding to each other, and the top surface is approximately perpendicular to the side surfaces, and the placing space is connected with the opening end and the hard disk can thereby be placed into the placing space through the opening end; and the first elastic arm is formed on the top face through integrated formation, and the second elastic arm is formed at least on one side surface through integrated formation, and the first elastic arm comprises a first pressing end and the second elastic arm comprises a second pressing end, wherein the first and the second pressing ends are extended into the placing space; and the removable component comprises a connecting end and a removable end, wherein the connecting end is installed on the housing.

As the first and the second elastic arms of the removable hard-disk structure without screws according to the present invention are all cantilever types, the first pressing end of the first elastic arm is away from the top surface with a first distance to extend into the placing space, and the second pressing end of the second elastic arm is away from the side surfaces with a second distance to extend into the placing space, thereby, the first and the second pressing ends tightly press the hard disk which allows the hard disk shifting along a first linear direction and being placed into the placing space. Since the pressing ends tightly press the hard disk, a connecting slot at the rear end of the hard disk and the connecting head at the bottom end of the housing are combined accurately. When the hard disk is placed into the placing space, the removable component made of a soft toughness material is attached to the hard disk. The housing comprises a door plate corresponding to the opening end, when the door plate is placed at a first position, the placing space is sealed and the door plate is fixed on the housing by placing the hook holding body of the door plate into the placing slot of the two sides of the opening end to keep the hard disk therein without coming off; as the door plate is placed at a second position, the placing space is opened, and the hard disk placed in the placing space can be shifted and withdrawn from the housing along a second linear direction which is opposite to the first linear direction by applying force on the removable end of the removable component.

The follow paragraph provides a preferred embodiment with related figures as assistance and makes a detailed description as followed to make sure the examiner will be able to realize and understand the features and effects of the create.

DETAILED DESCRIPTION OF PREFERRED EMBODIMENTS

The paragraph below provides a preferred embodiment of the removable hard-disk structure without screws according to the present invention with related figures as attached descript exhaustively to let the object, features and advantages of the create be more clear and easily to be understand. Where the same component is descript with same mark.

Figure 1:
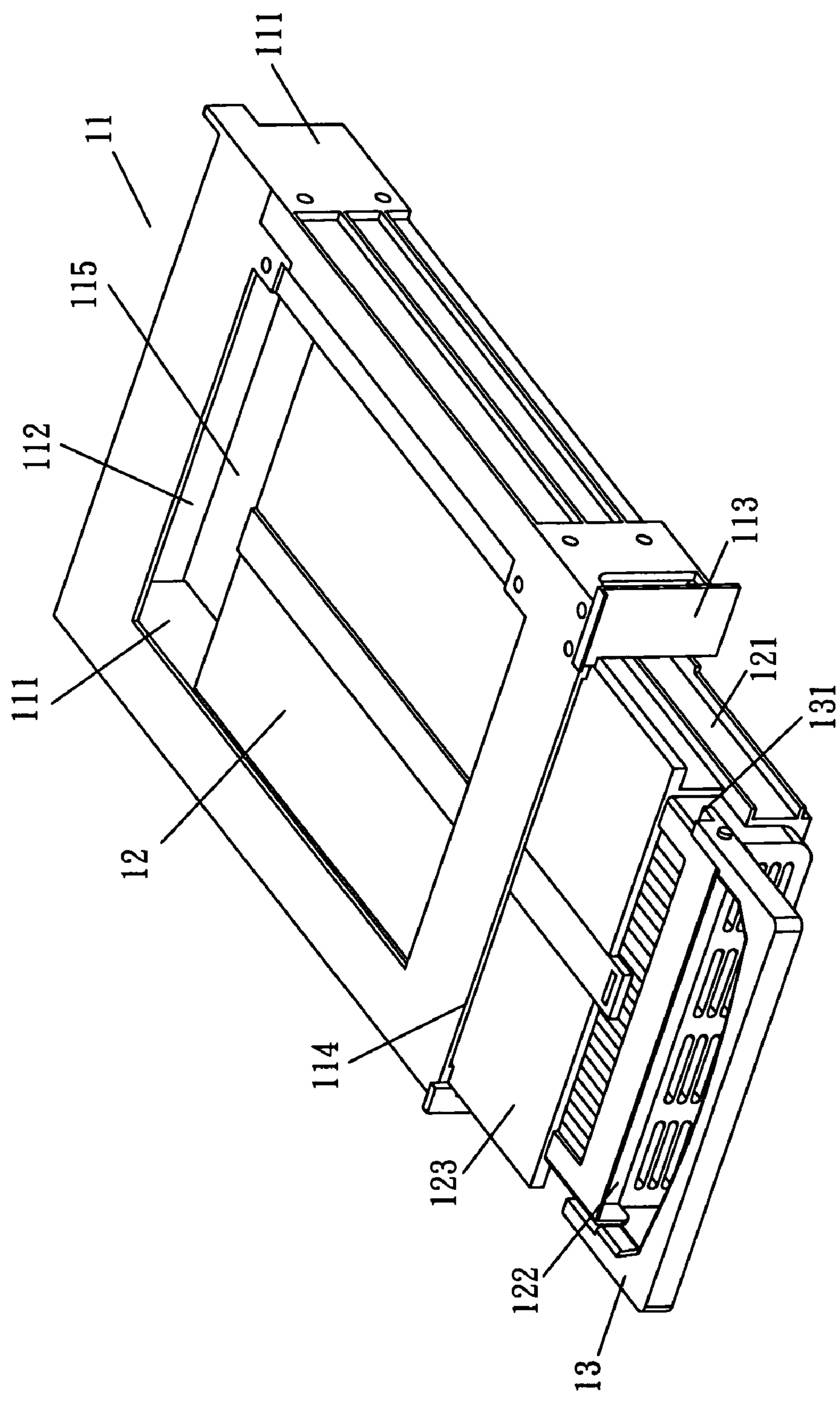
FIG. 1 is a schematic view shows a conventional removable hard disk structure.
Figure 2:
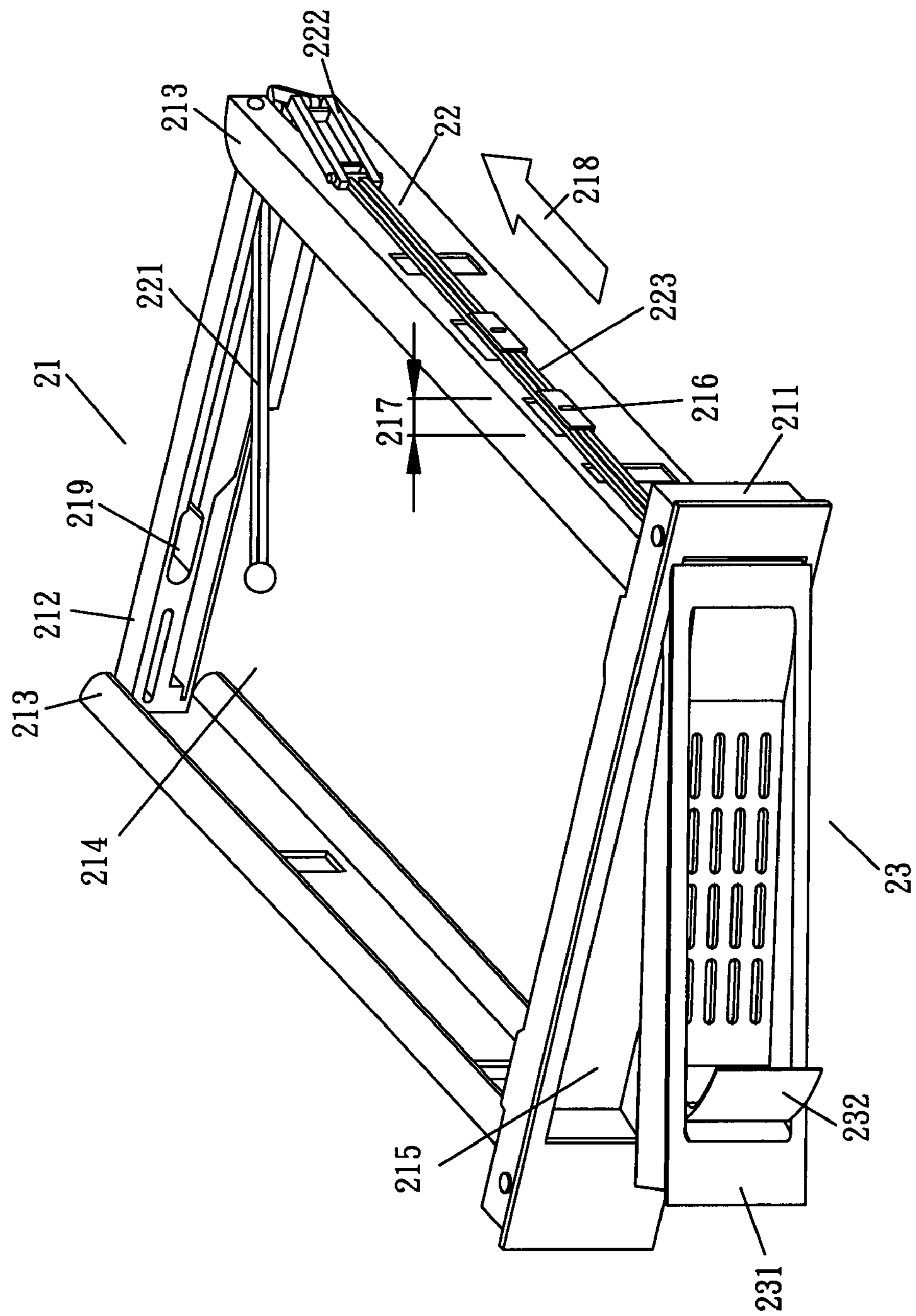
FIG. 2 is a schematic view shows a conventional quick pluggable hard disk structure.
Figure 3:
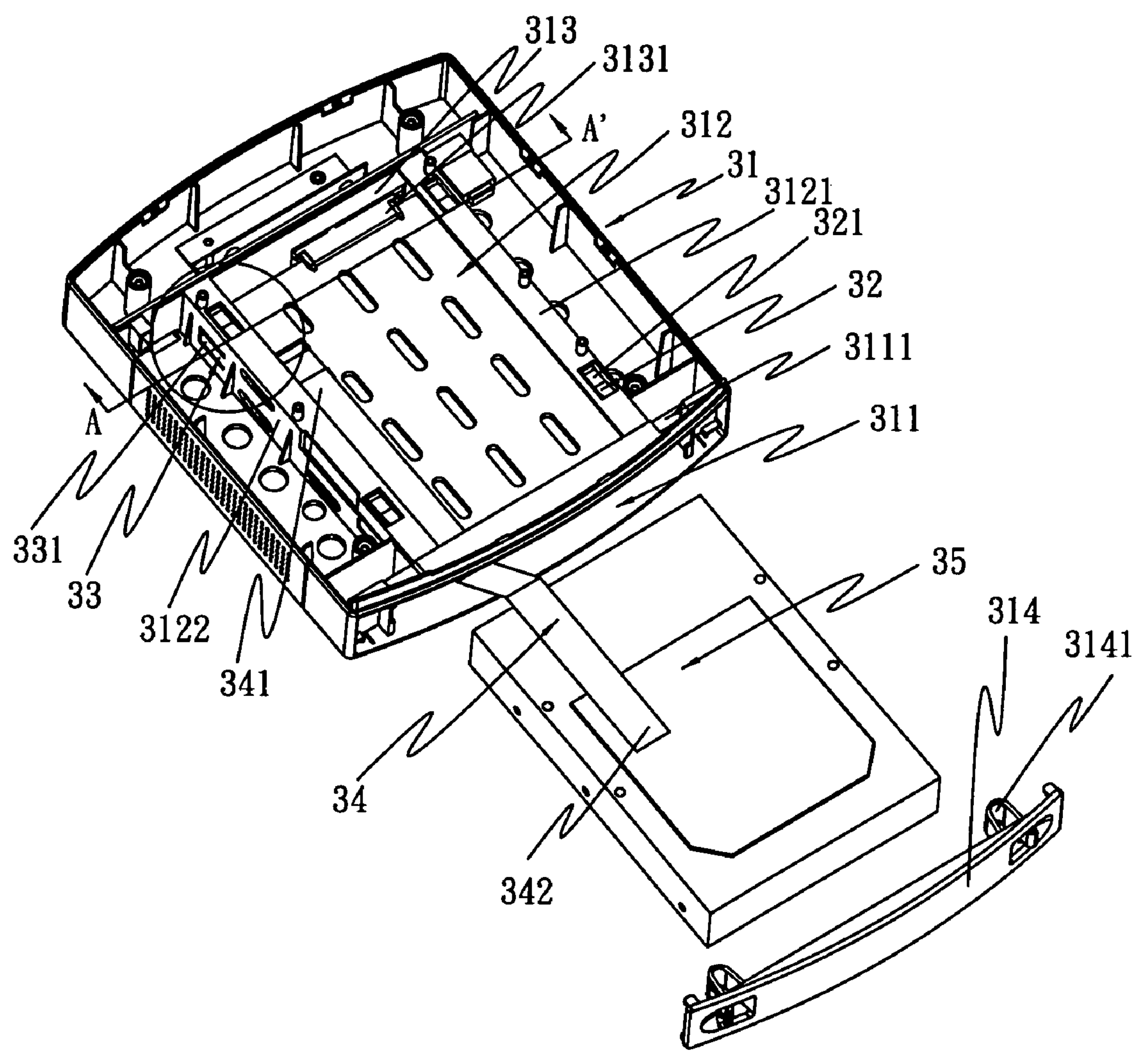
FIG. 3 is a schematic view shows the removable hard disk structure without screws according to the present invention.
Figure 4:
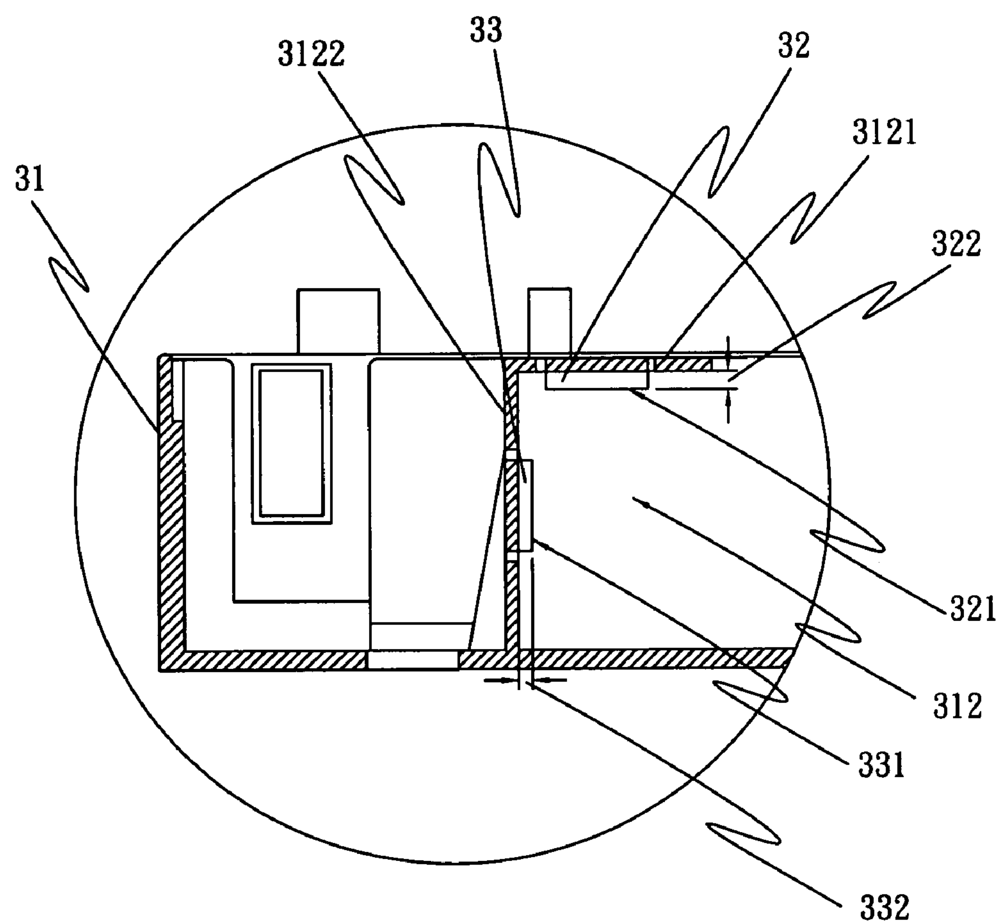
FIG. 4 is an enlarged cross-section view of FIG. 3 along AA'.

Refer to FIG. 3 and FIG. 4, FIG. 3 is a schematic view showing a removable hard-disk structure without screws according to the present invention, and FIG. 4 is an enlarged cross-section view of FIG. 3 along AA'. According to FIG. 3, the removable hard-disk structure without screws comprises a housing 31, at least one first elastic arm 32, at least one second elastic arm 33 and a removable component 34. The housing 31 comprises an opening end 311 and a placing space 312, wherein the placing space 312 has a top surface 3121 and two side surfaces 3122 corresponding to each other, and the top surface 3121 is approximately perpendicular to the side surfaces 3122, and the placing space 312 is connected to the opening end 311 and a hard disk 35 can thereby be placed into the placing space 312 through the opening end 311; and the first elastic arm 32 is formed on the top face 3121 through integrated formation, and the second elastic arm 33 is formed at least on one side surface 3122 through integrated formation, and the first elastic arm 32 comprises a first pressing end 321 and the second elastic arm 33 comprises a second pressing end 331, wherein the first and the second pressing ends 321, 331 are extended into the placing space; and the removable component 34 comprises a connecting end 341 and a removable end 342, wherein the connecting end 341 is installed on the housing 31. As shown in FIG. 4, the first and the second elastic arms 32, 33 are cantilever structures, and the first pressing end 321 of the first elastic arm 32 is away from the top surface 3121 with a first distance 322 to extend into the placing space 312, and the second pressing end 331 of the second elastic arm 33 is away from the side surfaces 3122 with a second distance 332 to extend into the placing space 312. Since the first and the second pressing ends 321, 331 tightly press the hard disk 35, thus a connecting slot at the rear end of the hard disk 35 and the connecting head 3131 at the bottom end 313 of the housing 31 are combined accurately. While the hard disk 35 is placed into the placing space 312, the removable component 34 made of soft toughness material is attached to the hard disk 35. The housing 31 comprises a door plate 314 corresponding to the opening end 311. While the door plate 314 is placed at a first position 38, the placing space 312 is sealed and the door plate 314 is fixed on the housing 31 by placing the hook holding body 3141 of the door plate 314 into the placing slot 3111 of the two sides of the opening end 311.

Figure 5:
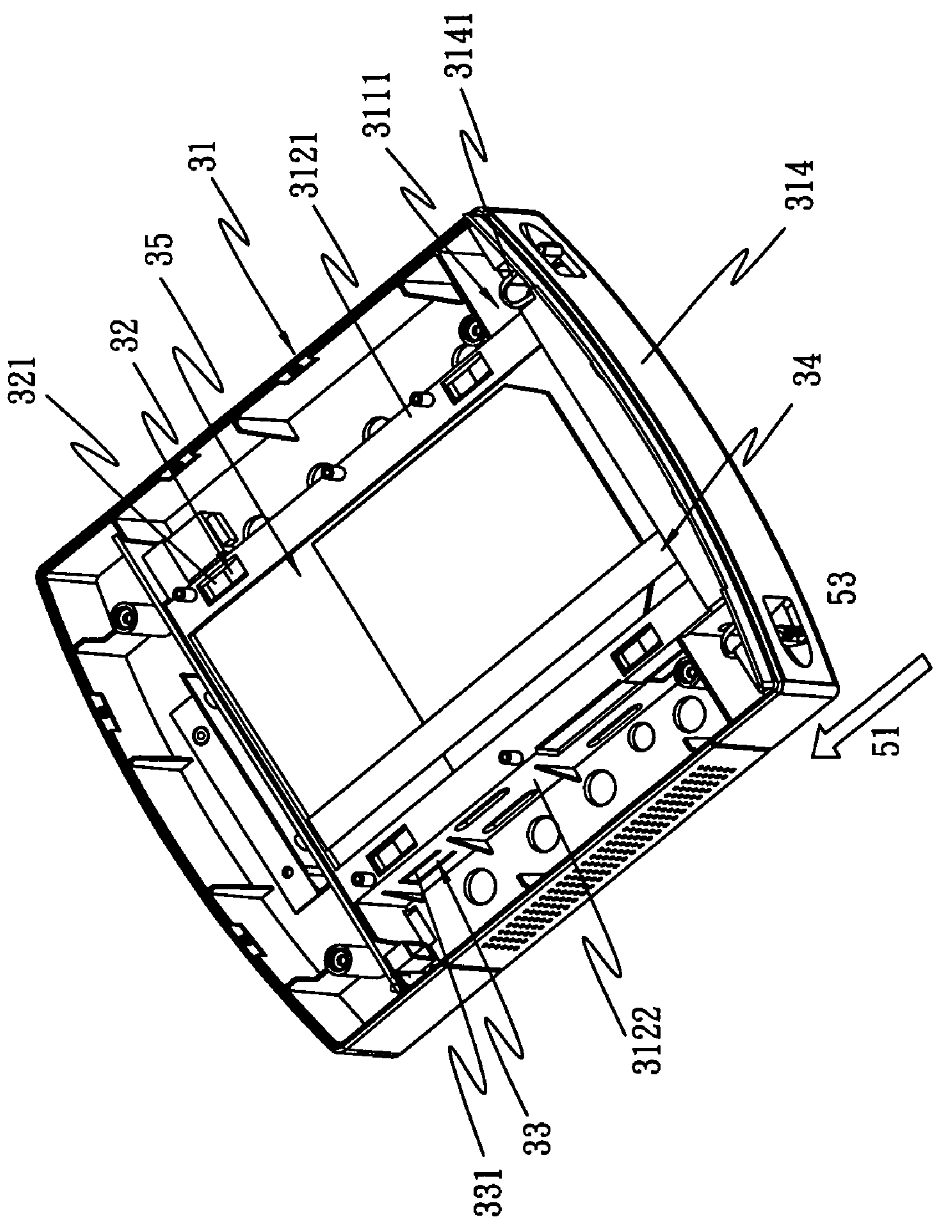
FIG. 5 is a schematic view shows the placement of the hard disk according to the present invention.
Figure 6:
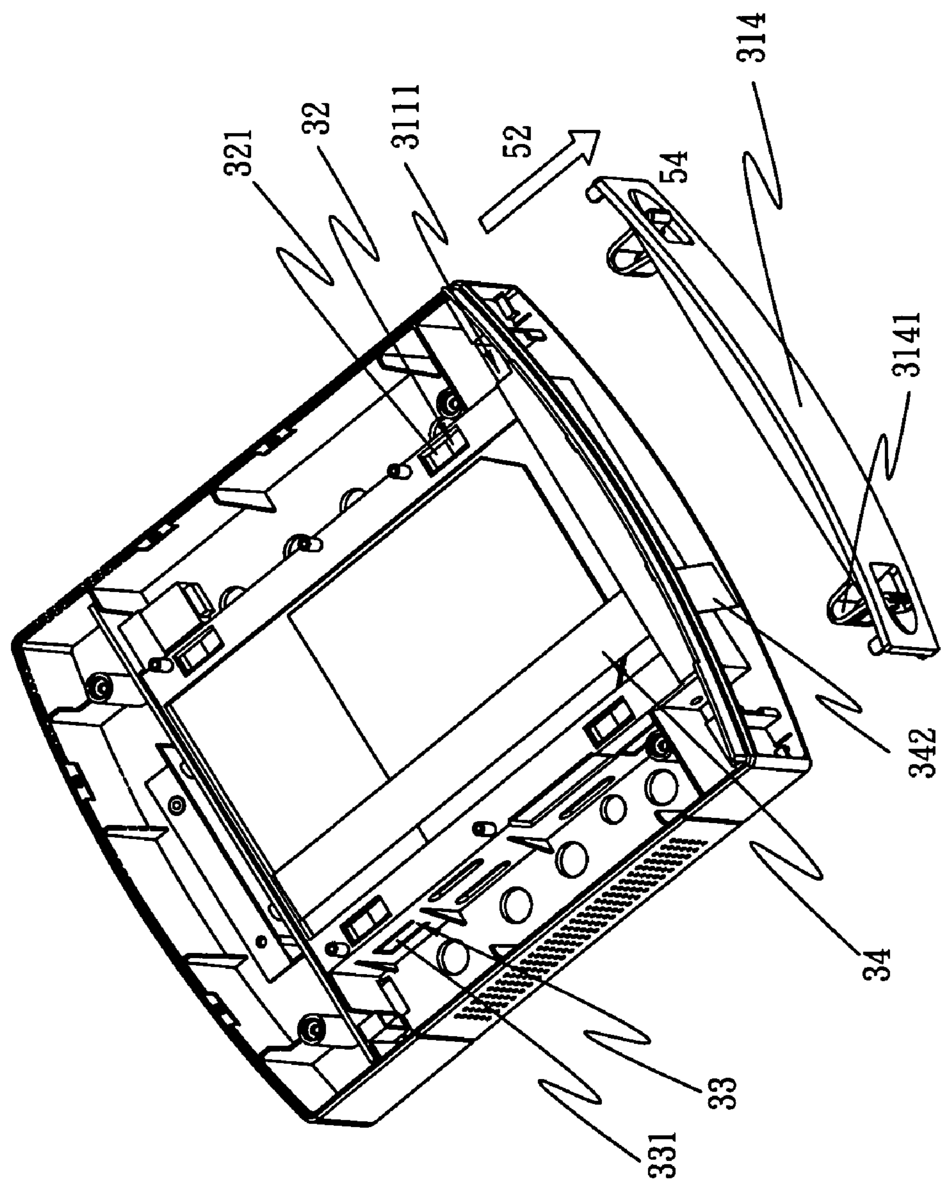
FIG. 6 is a schematic view shows the removal of the hard disk according to the present invention.

Refer to FIG. 5 and FIG. 6, FIG. 5 is a schematic view of placement of the hard disk according to the present invention and FIG. 6 is a schematic view of the removable hard disk according to the present invention. According to FIG. 5, while placing the hard disk 35 into the placing space 312, the hard disk 35 is tightly pressed by the first pressing end 321 and the second pressing end 331, and the hard disk 35 is thereby shifted along a first linear direction 51 and then placed into the placing space 312. As placing the hard disk 35, the removable component 34 will also attach the hard disk 35 and a removable end 342 is reserved for removing the hard disk 35. While the door plate 314 is placed on a first position 53, the placing space 312 is sealed and the door plate 314 is fixed on the housing 31 by placing the hook holding body 3141 of the door plate 314 into the placing slot 3111 of the two sides of the opening end 311, and the hard disk 35 is thereby kept from coming off. According to FIG. 6, while removing the hard disk 35 from the housing 31, the door plate 314 is primarily departed from the housing 31 to the second position 54 by pressing the hook holding body 3141 of the door plate 314, then the removable component 34 attached to the hard disk 35 drives the hard disk 35 to withdraw from the housing 31 along a second linear direction 52 which is opposite to the first linear direction 51 by applying force on the removable end 342 and the removing actions is finally completed.

The above disclosure is only for examples but not for restrictions. Any modifications and replacements based on the disclosures and suggestions of the present invention as described without departing from the characteristics thereof should be covered in the following claims as appended.

What is claimed is:

1. A removable hard disk structure without screws, comprising:

a housing comprising an opening end, a placing space and a door plate, wherein the placing space comprises a top surface and two side surfaces corresponding to each other, and the placing space is connected to the opening end so that the hard disk is placed into the placing space through the opening end;

at least one first elastic arm installed on the top surface and the first elastic arm comprising a first pressing end;

at least one second elastic arm installed on at least one side surface and the second elastic arm comprising a second pressing end; and a removable component comprising a connecting end and a removable end, wherein the connecting end is installed on the housing;

when the hard disk is placed into the placing space through the opening end, the hard disk is tightly pressed by the first pressing end of the first elastic arm and the second pressing end of the second elastic arm, and the hard disk is thereby shifted within the placing space along a first linear direction; when the hard disk is placed into the placing space, the hard disk is shifted along a second linear direction by applying force on the removable end of the removable component.

2. The removable hard disk structure without screws as claimed in claim 1, wherein the first elastic arm is a cantilever structure, and the first pressing end keeps a first distance away from the top surface and extends into the placing space thereby.

3. The removable hard disk structure without screws as claimed in claim 1, wherein the second elastic arm is a cantilever structure, and the second pressing end keeps a second distance away from the top surface and extends into the placing space thereby.

4. The removable hard disk structure without screws as claimed in claim 1, wherein the top surface and the side surfaces are approximately perpendicular to each other.

5. The removable hard disk structure without screws as claimed in claim 1, wherein a connecting slot of the rear end of the hard disk is connected with a connecting head of the bottom end of the placing space through the hard disk tightly pressed by the first pressing end of the first elastic arm and the second pressing end of the second elastic arm.

6. The removable hard disk structure without screws as claimed in claim 1, wherein the first elastic arm is formed on the top surface of the placing space through integrated molding.

7. The removable hard disk structure without screws as claimed in claim 1, wherein the second elastic arm is formed on the side surfaces of the placing space through integrated molding.

8. The removable hard disk structure without screws as claimed in claim 1, wherein the removing component is attached to the hard disk as the hard disk is placed into the placing space.

9. The removable hard disk structure without screws as claimed in claim 1, wherein the removable component is made of a soft toughness material.

10. The removable hard disk structure without screws as claimed in claim 1, wherein the removable component is a tear strip.

11. The removable hard disk structure without screws as claimed in claim 1, wherein the removable component is a ribbon.

12. The removable hard disk structure without screws as claimed in claim 1, wherein the housing has a door plate corresponding to the opening end, and as the door plate is at the first position, the placing space is sealed, and as the door plate is at the second position the placing space is opened.

13. The removable hard disk structure without screws as claimed in claim 12, wherein the two sides of the opening end have two placing slots, and the door plate has hook holding bodies corresponding to the placing slots and is placed into the placing slots to fix the door plate to the opening end.

14. The removable hard disk structure without screws as claimed in claim 1, wherein the first linear direction is opposite to the second linear direction.

* * * * *